United States Patent [19]
Gilbertson

[11] Patent Number: 5,308,213
[45] Date of Patent: May 3, 1994

[54] GROUND LEVEL LOADING UNIVERSAL TRAILER

[76] Inventor: Gerald M. Gilbertson, R.R. 1, Box 297B, Devils Lake, N. Dak. 58301

[21] Appl. No.: 79,262

[22] Filed: Jun. 21, 1993

[51] Int. Cl.⁵ .................................... B60P 1/44
[52] U.S. Cl. ............................ 414/482; 414/460; 414/483; 414/495; 414/537; 254/3 R
[58] Field of Search ............ 254/3 R, 3 C, 4 R, 4 C; 414/474, 475, 476, 480, 537, 469, 481, 482, 483, 484, 485, 458, 459, 460, 461, 495; 280/414.1, 43.17, 43

[56] References Cited

U.S. PATENT DOCUMENTS

| | | | |
|---|---|---|---|
| 2,121,153 | 6/1938 | Konicek | 414/485 |
| 2,405,299 | 8/1946 | Godwin | 414/484 |
| 2,856,091 | 10/1958 | Johnson | 414/483 |
| 2,954,137 | 9/1960 | Ash | 414/483 |
| 2,990,966 | 7/1961 | Schramm | 414/484 X |
| 3,082,892 | 3/1963 | Cox | 414/482 |
| 3,788,675 | 1/1974 | Wilander | 414/458 X |
| 4,395,185 | 7/1983 | Whaley | 414/483 |
| 4,685,855 | 8/1987 | Celli | 414/495 X |

FOREIGN PATENT DOCUMENTS

| | | | |
|---|---|---|---|
| 1288736 | 9/1991 | Canada | 414/483 |
| 1154794 | 4/1958 | France | 414/480 |
| 2150507 | 7/1985 | United Kingdom | 414/485 |

*Primary Examiner*—Frank E. Werner
*Attorney, Agent, or Firm*—David A. Lingbeck

[57] ABSTRACT

This invention relates to a ground level loading universal trailer comprising a U-shaped frame; a support bed being pivotally connected to either side and near the rear end thereof to the frame which is mounted upon two stub axles having wheels mounted thereupon; a pair of clevis-like members fixedly attached to the sides and near the forward end of the support bed to receive a portion of the frame to lock the support bed in a transport mode with locking pins; a tongue device having a first tongue extension member fixedly attached to and extending forward the frame and having a second tongue extension member hingedly attached near a central portion thereof to the outer end of the first tongue extension member; and a winch mechanism mounted upon an upright elongate support member fixedly attached to the second tongue extension member for lowering and raising the support bed without any part of the tongue device being disconnected and with ease and convenience for a lone user, in particular.

6 Claims, 4 Drawing Sheets

5,308,213

GROUND LEVEL LOADING UNIVERSAL TRAILER

BACKGROUND OF THE INVENTION

The present invention relates to a ground level loading universal trailer which is generally drawn behind a vehicle and which is used to transport, in particular, wheeled means.

Different types of trailers capable of being lowered to the ground are known in the art. However, upon review of the prior art, none describe or suggest the ground level loading universal trailer of the present invention.

One known prior art is a GROUND LEVEL LOADING TRAILER, U.S. Pat. No. 3,788,675, which comprises a load support for lying flat on the ground; and a U-shaped lifting device straddling the load support and pivoted on wheels with the lifting device inclined relative to the horizontal for lowering the load support to the ground level. To place the trailer into a transportation mode, the user must manually urge the lifting device downward into a generally horizontal locking position with the hitch.

Another known prior art is a SELF LOWERING TILT BED TRAILER, U.S. Pat. No. 2,990,966, which comprises a bed, wheels to either side of the bed, wheel arms supported on stub shafts, springs on the wheel arms, upwardly extending bed supporting plates, a tongue structure with tongue plates extending upwardly therefrom, and latches on the tongue plates to engage receiving holes in the bed supporting plates to hold the bed and tongue in a horizontal plane.

Also, another known prior art is a UNIVERSAL TRAILER, U.S. Pat. No. 4,685,855, which comprises an outer frame defining the tongue and sides of the trailer with wheels on either side of the outer frame; a bed secured intermediate the outer sides with at least three link members rotatably secured to the bed, which allow the bed to move from a position within the frame to a generally parallel position below the frame; and a lifting device for raising and lowering the bed with the frame.

Further, another known prior art is a LIFT/TILT-BED TRAILER, U.S. Pat. No. 5,137,414, which comprises a U-shaped frame mounted upon wheels and connected to a hitch extending forward thereof; four tracks pivotally mounted about the inside of the frame; a trailer bed with rollers fixedly attached about the bed and slidably mounted in the four tracks; and a winch means having a cord attached thereabout and connected to the front end of the trailer bed which can be lowered to the ground with the rollers sliding along the tracks.

Also, another known prior art is a VEHICLE BED UNLOADING DEVICE, U.S. Pat. No. 2,408,862, which comprises a longitudinally extending frame with a rear section rearwardly tiltable; a bed disposed above and supported by the main frame; a load engaging member for movement lengthwise; and a power actuating means connected to the load engaging member to move the load engaging member in selective opposite directions.

Yet, another known prior art is a TRANSLATABLE TILT-BED TRAILER APPARATUS, U.S. Pat. No. 5,137,414, which comprises an elongated support bed which is rollably mounted on the top side of a dual axle; a wheeled undercarriage provided with a manually operable mechanical brake system and a front-to-rear spring equalizing system; and a lockable articulated tongue connectable to a hitch on a vehicle and connected to the support bed which, when an item is locked, is rolled rearward upon the undercarriage which is locked, an tilted toward the ground for a vehicle to be moved upon the support bed.

There is a definite need for a ground level loading universal trailer which has a novel tongue means to lower and raise the support bed relative to the ground and which allows a lone user to quickly and conveniently load the trailer and which is not described or suggested by any of the prior art.

SUMMARY OF THE INVENTION

The present invention relates to a ground level loading universal trailer comprising a U-shaped frame pivotally mounted on a pair of stub axles having wheels rotatably mounted therewith; a support means being pivotally mounted on either side and near the rear end thereof to the U-shaped frame; a pair of clevis-like members fixedly attached to the sides and near the forward end of the support means; a tongue means having a first tongue extension member fixedly attached to the front end of the frame and having a second tongue extension member pivotally attached to the first tongue extension member; and a winch mechanism fixedly mounted upon an upright support member which is fixedly mounted upon the second tongue extension member. The winch mechanism has a strap-like member carried across a strap guide fixedly attached to the frame, and extending to and securely attached to an eyelet member which is fixedly attached to the forward end of the support bed for raising the support means in a transport mode.

It is an object of this invention to provide a ground level loading universal trailer which allows a lone user to conveniently and quickly load moveable objects such as vehicles and the like at ground level.

Another object of this invention is to provide a ground level loading universal trailer which allows the support bed to be lowered to ground level without having to unhitch any part of the tongue means unlike the prior art.

Yet, another object of this invention is to provide a ground level loading universal trailer which can be lowered to ground level and raised to a transport mode manually with little effort on the part of the user.

Further objects and advantages of the present invention will become more apparent as the description proceeds and when taken in conjunction with the accompanying drawing wherein:

DETAIL DESCRIPTION OF THE INVENTION

Figure 1:
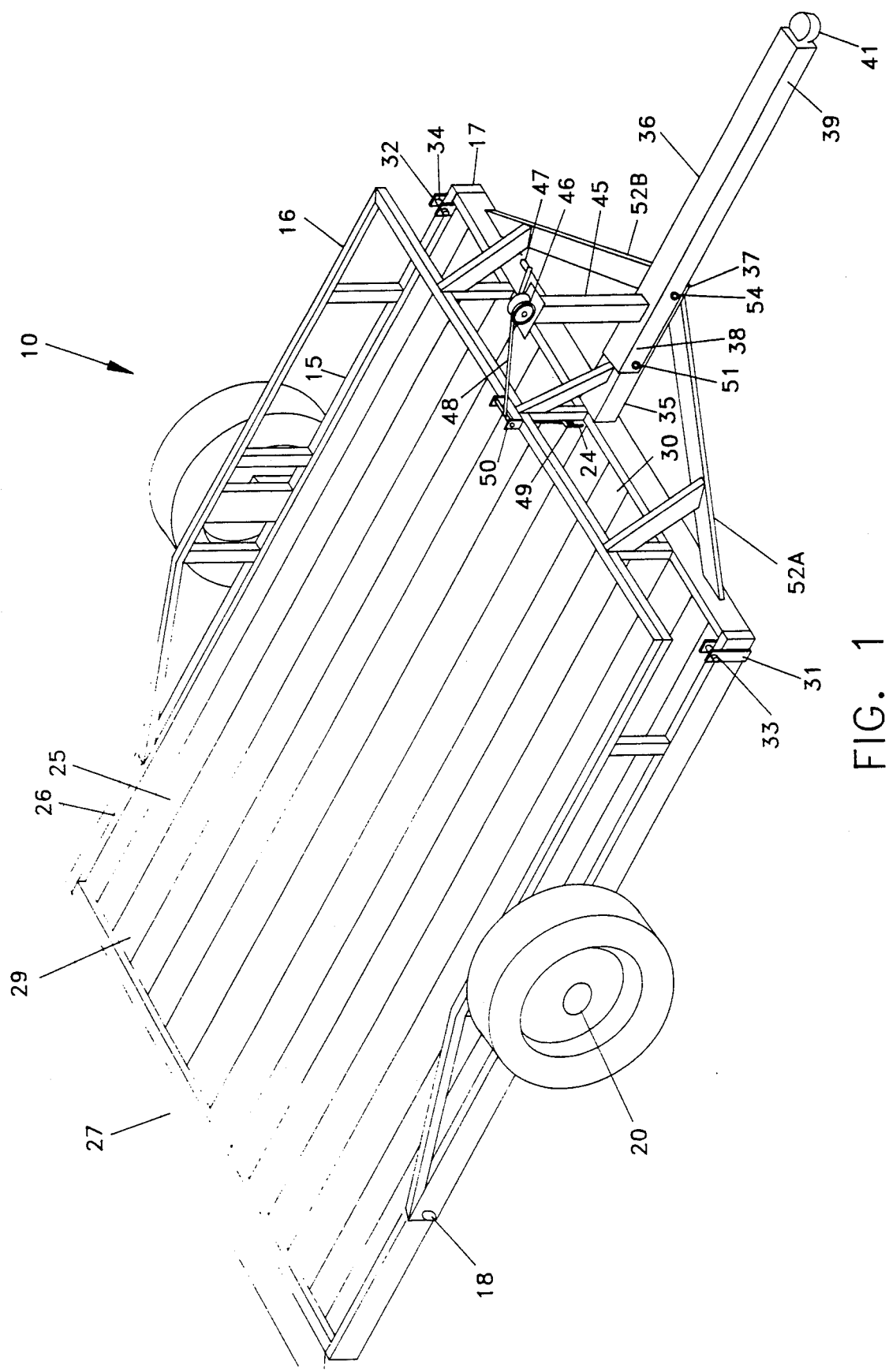
FIG. 1 is a top perspective view of the ground level loading universal trailer in transport mode.
Figure 2:
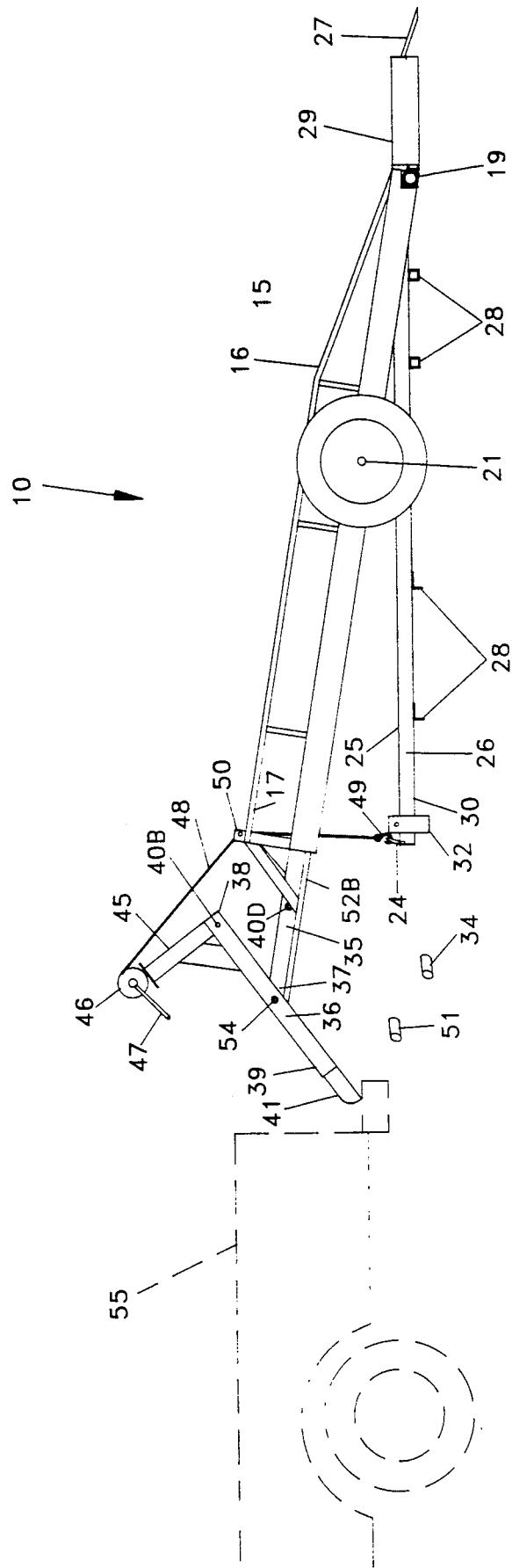
FIG. 2 is a side elevation view of the ground level loading universal trailer in a ground level loading mode and hitched to a partially-viewed vehicle.

Referring to FIGS. 1 through 4, in particular, the ground level loading universal trailer 10 is illustrated as having a U-shaped frame 15 preferably made of metal; a support means having a support bed 25 preferably made of wood and having a rim member 26 preferably made of metal and fixedly attached thereabout, and further having a plurality of crossbeams 28 parallel to one another and disposed between and connected to the rim member 26 to support the support bed 25 which is journaled at the sides thereof to the U-shaped frame 15; a tongue means having a first tongue extension member 35 fixedly attached to the front end 17 of the frame 15 and extending forward thereof and having a second tongue extension member 36 pivotally attached to the outer end 37 of the first tongue extension member 36; an upright, elongate support member 45 fixedly mounted upon the second tongue extension member 36; a winch mechanism 46 securely mounted upon the upright elongate support member 45 and having a crank 47 and a spool with a strap-like member 48 wound thereabout and carried by a guide member 50 fixedly attached or welded to the front end 17 of the frame 15, and extending to the support bed 25 and securely attached to an eyelet member 24 which is fixedly attached or welded to the forward end of the support bed 25; at least two stub axles 20 & 21 upon which the U-shaped frame 15 is mounted and upon which at least two wheels are mounted for rotation therewith; and a locking means comprising a pair of clevis-like member 31 & 32 fixedly attached or welded on opposite sides of the support bed 25 for locking the support bed 25 into a transport mode.

FIG. 1 shows the U-shaped frame 15 having open back ends and a closed front end 17 and further having sides which are securely mounted upon two axles 20 & 21. The support bed 25 having a rear end 29 and a forward end 30 is disposed between the rails 16 of the frame 15 and is journaled on either side and near the rear end 29 of the support bed 25 to the frame 15 which has two spindle-like members 18 & 19 fixedly disposed therein on opposite sides of the support bed 25 and extending inwardly therefrom and rotatably extending into an elongate tubular member (not shown) which is transversely and fixedly mounted to the underside of the support bed 25. The support bed 25 further has an end gate 27 hingedly connected at the rear end 29 thereof, which functions also as a ramp for loading and unloading wheeled apparatuses as such.

Two clevis-like members 31 & 32 are fixedly attached or welded to the sides of and near the forward end 30 of the support bed 25 and extend upwardly to receive the rails 16 of the frame 15 for locking the support bed 25 in a transport mode.

FIGS. 1 through 4 show the tongue means having a first tongue extension member 35 and a second tongue extension member 36 hingedly connected with a bolt 54 or the like near a central portion thereof to the outer end 37 of the first tongue extension member 35 which is fixedly attached to the front end 17 of the frame 15. The second tongue extension member 36 has an essentially laterally cross-sectional U-shaped rearward portion 38 which is dimensioned to removeably mount or fit about the outer end portion 37 of the first tongue extension member 35.

Figure 3:
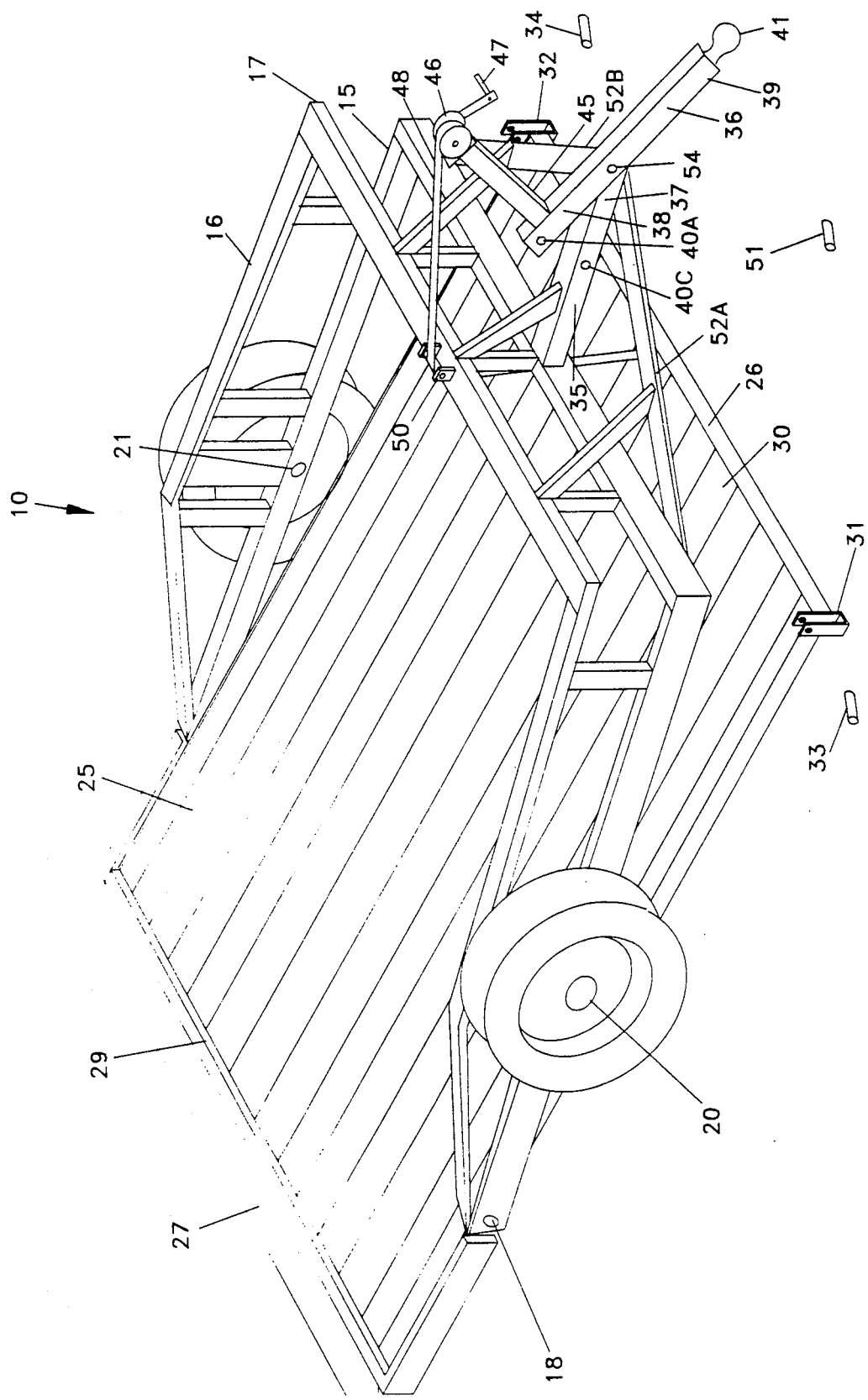
FIG. 3 is a detail view in perspective of the front end of the ground level loading universal trailer showing, in particular, the tongue means and the pair of clevis-like members in a ground level loading mode.
Figure 4:
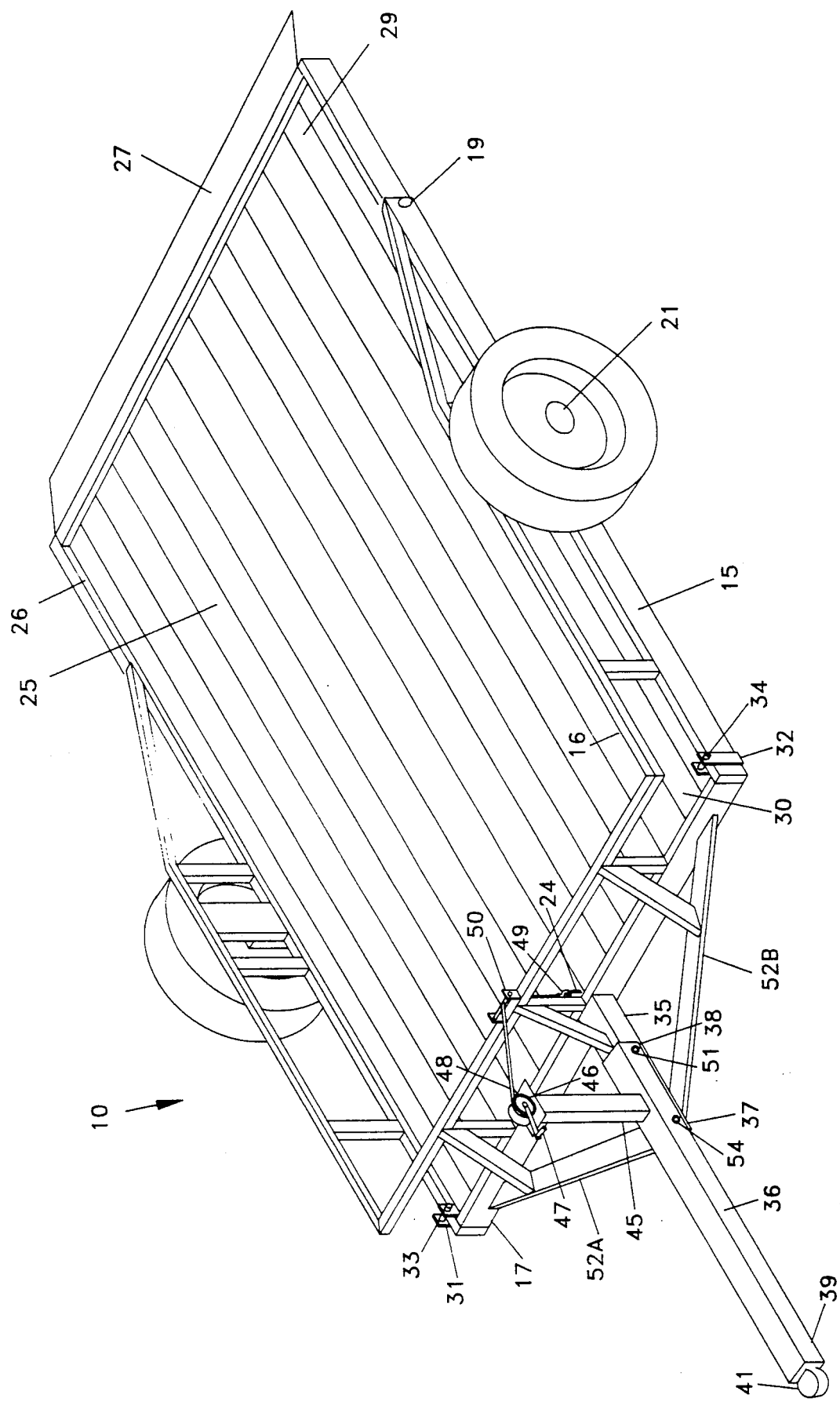
FIG. 4 is a detail view in perspective of the front end of the ground level loading universal trailer showing, in particular, the tongue means and the pair of clevis-like member in a transport mode.

FIGS. 3 and 4 show the upright, elongate support member 45 fixedly attached or welded upon the second tongue extension member 36 near the rearward end thereof and extending upwardly therefrom, and also show the winch mechanism 46 securely mounted with bolts or the like upon the upright elongate support member 45 with the strap-like member 48 carried by a guide member 50 which is fixedly attached to the front end 17 of the frame 15, and connected with a conventional fastener 49 to the eyelet member 24 fixedly attached to the support bed 25. The frontal end 39 of the second tongue extension member 36 has a ball hitch-receiving means 41 fixedly attached thereto for removeably mounting to a ball hitch 56 on a vehicle 55 for towing the trailer 10. As an alternate embodiment, the front end 39 of the second tongue extension member 36 can comprise a universal hitch means to removeably mount to any hitch on a vehicle or the like. To stabilize and strengthen the tongue means, two braces 52a & 52b are fixedly attached or welded to the sides of the first tongue extension member 35 and angularly extend rearwardly therefrom and are fixedly attached or welded to the front end 17 of the frame 15 near the sides thereof.

To lower the ground level loading universal trailer 10 to the ground, the user removes the two locking pins 33 & 34 from the two clevis-like members 31 & 32, which lock the support bed 25 to the frame 15 in a transport mode, and then removes the elongate locking member 51 from the tongue means, which is removeably slidable through opposed holes 40a & 40b in the second tongue extension member 36 and through opposed holes 40c & 40d in the first tongue extension member 35 to lock the second tongue extension member 36 to the first tongue extension member 35, and then releases the winch mechanism 46 to let out the strap-like member 48 from about the spool, which allows the forward end of the support bed 25 to gravitationally lower the ground, which effects the rear end 29 of the support bed 25 to pivot on the frame 15 and lower to the ground with the front end 17 of the frame 15 and inclining relative to the ground and with the first tongue extension member 35 inclining along with the frame 15 and with the rearward end 38 of the second tongue extension member 36 pivoting about the hinge 54 to form generally an inverted V-shaped angle with the first tongue extension member 35 while remaining connected to the hitch 56 on the vehicle 55.

To raise the support bed to a transport mode, the user actuates the winch mechanism 46 by turning the crank 47 to draw the strap-like member 48 about the spool, which raises the forward end 30 of the support bed 25, which causes the rear end 29 of the support bed to pivot about the frame 15 and rise, which causes the front end 17 of the frame 15 to lower generally parallel to the ground with the rails 16 of the frame 15 being received in the two clevis-like members 31 & 32, upon which the user slides the two locking pins 33 & 34 through the holes in the clevis-like members 31 & 32 to lock the support bed 25 in a transport mode. In cooperation with the lowering of the frame 15, the first tongue extension member 35 is also lowered, which causes the second tongue extension member 36 to pivot upwardly until the U-shaped rearward portion 38 of the second tongue extension member 36 engages and fits about the first tongue extension member 35. To secure the second tongue extension member 36 to the first tongue extension member 35, the elongate locking member 51 should be inserted through the two opposed holes 40a & 40b in the rearward portion 38 of the second tongue extension member 36 and should be inserted through the two opposed holes 40c & 40d in the first tongue extension member 35, which disposed in the first tongue extension member 35 to substantially align with the two opposed holes 40a & 40b in the second tongue extension member 36.

Various changes and departures may be made to the invention without departing from the spirit and scope thereof. Accordingly, it is not intended that the invention be limited to that specifically described in the specification or as illustrated in the drawing but only as set forth in the claims.

What is claimed is:

1. A ground level loading universal trailer comprising wheeled means having a plurality of axles for moving said universal trailer;

a frame being generally U-shaped and securely mounted upon said wheeled means, said frame having a front end and a back end and further comprising a plurality of interconnected rails;

a support bed having a rear end and a forward end and having sides which are journaled to said frame of said support bed;

a locking means for locking said support bed in a transport mode;

a tongue means having a first tongue extension member fixedly attached to said front end of said frame and extending therefrom and having an outer end, said tongue means further having a second tongue extension member having a frontal end and a rearward end and being hingedly connected to said first tongue extension member, said second tongue extension member further having a hitch means at said frontal end for connecting to a hitch on a vehicle; and a winch mechanism securely mounted on an upright support member which is fixedly attached upon said second tongue extension member, said winch mechanism having a flexible member attached to the support bed for raising and lowering said support bed relative to the ground.

2. A ground level loading universal trailer as described in claim 1, wherein said locking means comprises a plurality of clevis-like members fixedly attached upon and extending upward from said support bed and dimensioned and positioned to receive said rails and comprises locking pins which removeably extend through said clevis-like members to lock said support bed in a transport mode.

3. A ground level loading universal trailer as described in claim 1, wherein said second tongue extension member has a laterally cross-sectional U-shaped rearward portion and pivots relative to said first tongue extension member to generally form and angle with said first tongue extension member as said support bed is lowered to said ground level.

4. A ground level loading universal trailer as described in claim 3, wherein said second tongue extension member has a rearward portion which is dimensioned to removeably fit about and outer end portion of said first tongue extension member when said support bed is in a transport mode.

5. A ground level loading universal trailer as described in claim 4, wherein said tongue means comprises an elongate locking member slidably insertable through said second tongue extension member and through said first tongue extension member for locking said second tongue extension member to said first tongue extension member when said support bed is in a transport mode.

6. A ground level loading universal trailer as described in claim 1, wherein said winch mechanism comprises a said flexible member carried by a guide member fixedly attached to said frame, said flexible member also being removeably fastened to the forward end of said support bed, for raising said support bed relative to said frame.

* * * * *